United States Patent
Banning et al.

(10) Patent No.: US 7,084,189 B2
(45) Date of Patent: Aug. 1, 2006

(54) PHASE CHANGE INKS WITH ISOCYANATE-DERIVED ANTIOXIDANTS AND UV STABILIZERS

(75) Inventors: Jeffery H. Banning, Hillsboro, OR (US); Donald R. Titterington, Newberg, OR (US); Mary Ryan-Hotchkiss, Portland, OR (US)

(73) Assignee: Xerox Corporation, Stamford, CT (US)

(*) Notice: Subject to any disclaimer, the term of this patent is extended or adjusted under 35 U.S.C. 154(b) by 362 days.

(21) Appl. No.: 10/369,981

(22) Filed: Feb. 20, 2003

(65) Prior Publication Data

US 2004/0167249 A1    Aug. 26, 2004

(51) Int. Cl.
 C09D 11/02 (2006.01)
 C08K 15/00 (2006.01)
 C08K 15/06 (2006.01)
 C08K 15/30 (2006.01)

(52) U.S. Cl. .............. 523/160; 252/183.12; 106/31.29; 106/31.61

(58) Field of Classification Search ................ 523/160, 523/161; 106/31.29, 31.3, 31.61, 31.62; 524/91, 99, 323, 324, 330, 336, 291, 359; 252/183.12
See application file for complete search history.

(56) References Cited

U.S. PATENT DOCUMENTS

| | | | |
|---|---|---|---|
| 3,653,932 A | 4/1972 | Berry et al. | 106/22 |
| 3,657,184 A * | 4/1972 | Segawa et al. | 524/199 |
| 4,256,493 A | 3/1981 | Yokoyama et al. | 106/22 |
| 4,390,369 A | 6/1983 | Merritt et al. | 106/31 |
| 4,484,948 A | 11/1984 | Merritt et al. | 106/31 |
| 4,684,956 A | 8/1987 | Ball | 346/1.1 |
| 4,851,045 A | 7/1989 | Taniguchi | 106/31 |
| 4,853,478 A * | 8/1989 | Colvin et al. | 560/32 |
| 4,889,560 A | 12/1989 | Jaeger et al. | 106/27 |
| 4,889,761 A | 12/1989 | Titterington et al. | 428/195 |
| 5,006,170 A | 4/1991 | Schwarz et al. | 106/20 |
| 5,151,120 A | 9/1992 | You et al. | 106/27 |
| 5,221,335 A | 6/1993 | Williams et al. | 106/23 |
| 5,372,852 A | 12/1994 | Titterington et al. | 427/288 |
| 5,389,958 A * | 2/1995 | Bui et al. | 347/103 |
| 5,496,879 A | 3/1996 | Griebel et al. | 524/320 |
| 5,574,078 A * | 11/1996 | Elwakil | 523/161 |
| 5,621,022 A | 4/1997 | Jaeger et al. | 523/161 |
| 5,643,356 A | 7/1997 | Norh et al. | 106/31.49 |
| 5,750,604 A | 5/1998 | Banning et al. | 524/187 |
| 5,780,528 A | 7/1998 | Titterington et al. | 523/161 |
| 5,782,966 A | 7/1998 | Bui et al. | 106/31.43 |
| 5,783,658 A | 7/1998 | Banning et al. | 528/590 |
| 5,827,918 A | 10/1998 | Titterington et al. | 524/590 |
| 5,830,942 A | 11/1998 | King et al. | 524/590 |
| 5,855,655 A | 1/1999 | Norh et al. | 106/31.27 |
| 5,919,839 A | 7/1999 | Titterington et al. | 523/161 |
| 6,673,139 B1 * | 1/2004 | Wu et al. | 106/31.29 |
| 6,811,596 B1 * | 11/2004 | Bedford et al. | 106/31.29 |
| 6,841,589 B1 * | 1/2005 | Schmidt et al. | 523/160 |
| 2003/0019394 A1 * | 1/2003 | Itoh | 106/31.29 |
| 2003/0072871 A1 * | 4/2003 | Yamazaki et al. | 427/160 |

FOREIGN PATENT DOCUMENTS

| | | |
|---|---|---|
| EP | 0 187 352 | 7/1986 |
| EP | 0 206 286 | 12/1986 |
| EP | 816410 A1 * | 1/1998 |
| JP | 03037277 A * | 2/1991 |
| JP | 03259905 A * | 11/1991 |
| WO | WO 92/08747 A1 * | 5/1992 |
| WO | WO 94/04619 | 3/1994 |
| WO | WO 94/14902 | 7/1994 |
| WO | WO 97/20000 | 6/1997 |

OTHER PUBLICATIONS

English abstract for German Patent Publication DE 4205636AL (1993).
English abstract for German Patent Publication DE4205713AL (1993).

* cited by examiner

Primary Examiner—Callie Shosho
(74) Attorney, Agent, or Firm—Judith L. Byoric

(57) ABSTRACT

Disclosed is a phase change ink composition comprising (a) a colorant and (b) the reaction product of (i) an isocyanate and (ii) an antioxidant or UV stabilizer molecule having thereon (A) at least one isocyanate-reactive hydroxyl group and/or (B) at least one isocyanate-reactive primary or secondary amino group.

40 Claims, No Drawings

PHASE CHANGE INKS WITH ISOCYANATE-DERIVED ANTIOXIDANTS AND UV STABILIZERS

BACKGROUND OF THE INVENTION

The present invention is directed to hot melt or phase change inks. More specifically, the present invention is directed to phase change inks particularly suitable for use in phase change ink jet printers. One embodiment of the present invention is directed to a phase change ink composition comprising (a) a colorant and (b) the reaction product of (i) an isocyanate and (ii) an antioxidant or UV stabilizer molecule having thereon (A) at least one isocyanate-reactive hydroxyl group and/or (B) at least one isocyanate-reactive primary or secondary amino group.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 5,750,604 (Banning et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,780,528 (Titterington et al.), the disclosure of which is totally incorporated herein by reference, discloses isocyanate-derived colored resins made by reacting an alcohol and/or amine, an isocyanate, and a nucleophilic molecule containing a chromogen. The isocyanate-derived colored resins are useful as colorant materials in phase change ink compositions.

U.S. Pat. No. 5,782,966 (Bui et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,783,658 (Banning et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,827,918 (Titterington et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of diurethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,830,942 (King et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of diurethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,919,839 (Titterington et al.), the disclosure of which is totally incorporated herein by reference, discloses colored waxes made by reacting selected nucleophiles, including alcohol containing colorants, with an isocyanate. A phase change ink is made by blending the colored wax with a clear ink carrier composition. The clear ink carrier composition can be a fatty amide-based material and/or a combination of isocyanate-derived resins in which the order of addition of the isocyanate and the different nucleophiles can tailor the distribution of di-urethane, mixed urethane/urea, and/or di-urea molecules in the final resin product. The colored wax materials are useful as ingredients with phase change ink carrier compositions to make phase change ink jet inks.

PCT Application WO 94/14902, the disclosure of which is totally incorporated herein by reference, discloses a material suitable for use in a hot melt ink, having a melting point of at least 65° C. and obtainable by reacting an aliphatic or aromatic diisocyanate with an at least stoichiometric amount of: (i) a monohydric alcohol component; or (ii) a monohydric alcohol component followed by another different monohydric alcohol component; or (iii) a monohydric alcohol component, followed by a dihydric alcohol component followed by a monohydric alcohol component; the monohydric alcohol component(s) comprising a monohydric aliphatic alcohol or an etherified or esterified dihydric aliphatic alcohol or dihydric polyalkylene glycol; as the dihydric alcohol component comprising a dihydric aliphatic alcohol or a dihydric polyalkylene glycol and being used in an amount of not more than 50 percent of the stoichiometric amount of hydroxyl groups required to react with the isocyanate groups on the diisocyanate.

While known compositions and processes are suitable for their intended purposes, a need remains for improved phase change inks. In addition, a need remains for phase change inks with improved lightfastness. Further, a need remains for phase change inks with improved lightfastness wherein the improved lightfastness is not obtained at the expense of other desirable ink characteristics. Additionally, a need remains for phase change inks with improved lightfastness and with a high degree of transparency. There is also a need for phase change inks that have the advantages provided by antioxidant or UV stabilizer additives but wherein the antioxidant or UV stabilizer does not diffuse out from the colorant or from the rest of the ink composition. In addition, there is a need for phase change inks that have the advantages provided by antioxidant or UV stabilizer additives but wherein the ink does not exhibit undesirable properties such as plasticization or the like as a result of the present of an antioxidant or UV stabilizer. Further, there is a need for phase change inks that have the advantages provided by antioxidant or UV stabilizer additives but wherein the antioxidant or UV stabilizer does not bloom at the surface of images generated with the ink. Additionally, there is a need for phase change inks that have the advantages provided by antioxidant or UV stabilizer additives wherein the antioxidant or UV stabilizer moiety can be maintained in close proximity to the colorant moiety.

SUMMARY OF THE INVENTION

The present invention is directed to a phase change ink composition comprising (a) a colorant and (b) the reaction product of (i) an isocyanate and (ii) an antioxidant or UV stabilizer molecule having thereon (A) at least one isocyanate-reactive hydroxyl group and/or (B) at least one isocyanate-reactive primary or secondary amino group.

DETAILED DESCRIPTION OF THE INVENTION

The inks of the present invention contain a material that is the reaction product of an isocyanate and an isocyanate-reactive hydroxyl-substituted and/or isocyanate-reactive amino-substituted antioxidant or UV stabilizer.

Isocyanates react with alcohols to form urethanes and with primary and secondary amines to form ureas. For example, a monoisocyanate reacts with an alcohol to form a urethane as follows:

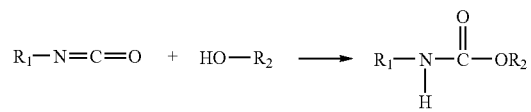

A monoisocyanate reacts with a primary or secondary amine to form a urea as follows:

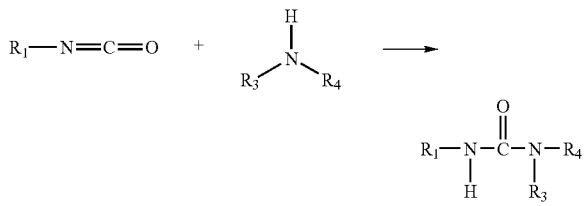

Diisocyanates react similarly; for example, isophorone diisocyanate reacts with two moles of alcohol to form a diurethane as follows:

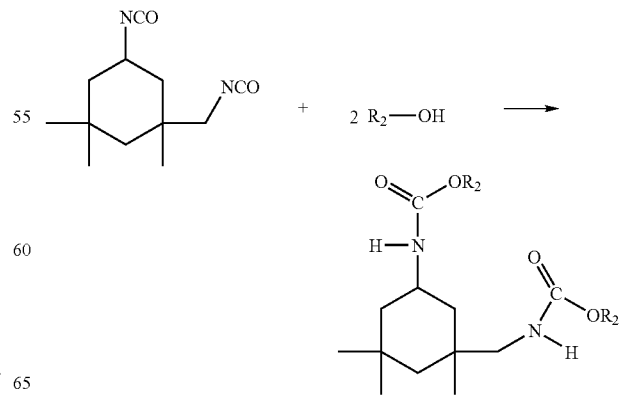

Diisocyanates can react with amines and alcohols to form mixtures of products as follows:

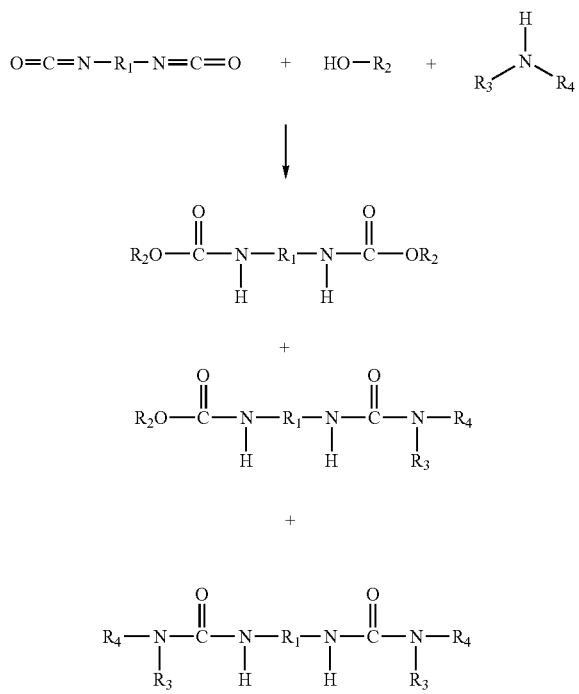

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include octadecylisocyanate; hexadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like, as well as mixtures thereof. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate (H12MDI); tetramethyl xylene diisocyanate (TMXDI); hexamethylene-1,6-diisocyanate (HDI); hexamethylene-1,6-diisocyanate; napthylene-1,5-diisocyanate; 3,3'-dimethoxy-4, 4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Any suitable reaction condition for making urethane or urea compounds by condensing alcohols or amines with isocyanates can be used to prepare antioxidants according to the present invention. Typically (although not necessarily), the reaction is carried out at elevated temperatures (for example, from about 60 to about 160° C.) in the presence of an optional urethane reaction catalyst, such as dibutyl tindilaurate, bismuth tris-neodecanoate, cobalt benzoate, lithium acetate, stannous octoate, triethylamine, or the like. In a specific embodiment, the reaction conditions are conducted in an inert atmosphere, such as argon or nitrogen gas or other suitable gases, to prevent oxidizing or yellowing of the reaction products and to prevent undesirable side reactions. The reaction can employ an inert solvent, such as toluene or the like, or can be performed neat (i.e., without a solvent). The mole ratio of reactants is adjusted so that the isocyanate functionalities are completely consumed in the reaction with a slight molar excess of alcohol-substituted or amine-substituted antioxidant typically remaining. The reactants can be added together in any order and/or added to the reaction as physical mixtures. If desired, reaction conditions and the order of the addition of reactants can be controlled for several reasons, such as to provide a controlled exothermic reaction, to tailor the distribution of molecules in the antioxidant-containing material, or the like. When doing these adjustments, the different reactivities to isocyanates of alcohols versus amines can be employed, as well as the different reactivities of the two separate isocyanate groups on IPDI. See, for example, J. H. Saunders and K. C. Frisch's "Polyurethanes Part I, Chemistry" published by Interscience of New York, N.Y. in 1962 and Olin Chemicals' LUXATE® IM isophorone diisocyanate technical product information sheet, which provide further explanation of this chemistry.

The antioxidant or UV stabilizer has thereon at least one isocyanate-reactive hydroxyl group and/or at least one isocyanate-reactive primary or secondary amino group. By "isocyanate reactive" is meant that the hydroxyl group or amino group is not incapable of reacting with an isocyanate compound by reason of steric hindrance, hydrogen bonding or other intramolecular forces, or any other reason that would prevent the hydroxyl group or amino group from reacting with an isocyanate.

One example of a class of suitable antioxidants and/or UV stabilizers is that of hydroxybenzophenones, including (but not limited to) those of the general formula

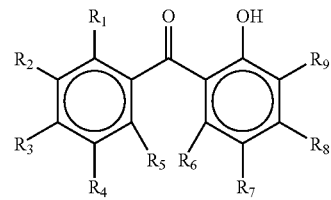

wherein, provided that at least one of $R_1$, $R_2$, $R_3$, $R_4$, $R_5$, $R_6$, $R_7$, $R_8$, and $R_9$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_1$, $R_2$, $R_3$, $R_4$, $R_5$, $R_6$, $R_7$, $R_8$, and $R_9$ each, independently of the others, is (i) a hydrogen atom, (ii) a hydroxy group, (iii) an amino group of the formula —$NR_{10}R_{11}$, wherein $R_{10}$ and $R_{11}$ each, independently of the others, is a hydrogen atom, an alkyl group as defined for $R_1$, $R_2$, $R_3$, $R_4$, $R_5$, $R_6$, $R_7$, $R_8$, and $R_9$, an aryl group as defined for $R_1$, $R_2$, $R_3$, $R_4$, $R_5$, $R_6$, $R_7$, $R_8$, and $R_9$, an arylalkyl group as defined for $R_1$, $R_2$, $R_3$, $R_4$, $R_5$, $R_6$, $R_7$, $R_8$, and $R_9$, or an alkylaryl group as defined for $R_1$, $R_2$, $R_3$, $R_4$, $R_5$, $R_6$, $R_7$, $R_8$, and $R_9$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable hydroxybenzophenones include 2,4-dihydroxybenzophenone, of the formula

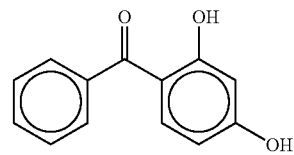

commercially available from Aldrich Chemical Co., Milwaukee, Wis., 2,2',4,4'-tetrahydroxybenzophenone, of the formula

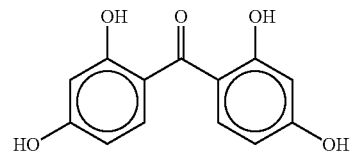

available from Aldrich Chemical Co., 2,4,4'-trihydroxybenzophenone, of the formula

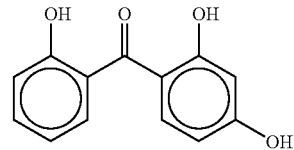

available from the Aldrich Chemical Co., and the like.

Another example of a class of suitable antioxidants and/or UV stabilizers is that of hydroxybenzotriazines, including (but not limited to) those of the formula

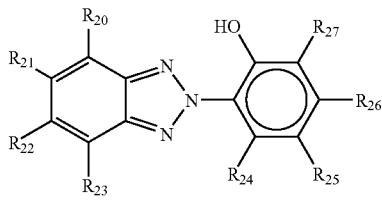

wherein, provided that at least one of $R_{20}$, $R_{21}$, $R_{23}$, $R_{23}$, $R_{24}$, $R_{25}$, $R_{26}$, and $R_{27}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{20}$, $R_{21}$, $R_{23}$, $R_{23}$, $R_{24}$, $R_{25}$, $R_{26}$, and $R_{27}$ each, independently of the others, is (i) a hydrogen atom, (ii) a hydroxy group, (iii) an amino group of the formula —$NR_{28}R_{29}$, wherein $R_{28}$ and $R_{29}$ each, independently of the others, is a hydrogen atom, an alkyl group as defined for $R_{20}$, $R_{21}$, $R_{23}$, $R_{23}$, $R_{24}$, $R_{25}$, $R_{26}$, and $R_{27}$, an aryl group as defined for $R_{20}$, $R_{21}$, $R_{23}$, $R_{23}$, $R_{24}$, $R_{25}$, $R_{26}$, and $R_{27}$, an arylalkyl group as defined for $R_{20}$, $R_{21}$, $R_{23}$, $R_{23}$, $R_{24}$, $R_{25}$, $R_{26}$, and $R_{27}$, or an alkylaryl group as defined for $R_{20}$, $R_{21}$, $R_{23}$, $R_{23}$, $R_{24}$, $R_{25}$, $R_{26}$, and $R_{27}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable hydroxybenzotriazines include 3-(2H-benzotriazol-2-yl)-4-hydroxyphenethyl alcohol, of the formula

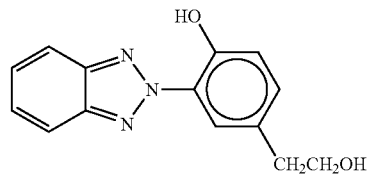

commercially available as NORBLOC 6000 from Normaco Inc., New Brunswick, N.J. and from Aldrich Chemical Co., Milwaukee, Wis., 2-(2H-benzotriazol-2-yl)-4-(1-hydroxyethyl)phenol, of the formula

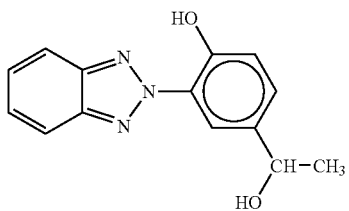

available as HPMC-BZ from Hoechst Celanese Corp., Charlotte, N.C., and the like.

Another example of a class of suitable antioxidants and/or UV stabilizers is that of hindered amine light stabilizers, including (but not limited to) those of the formula

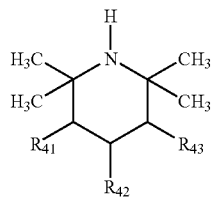

wherein, provided that at least one of $R_{41}$, $R_{42}$, and $R_{43}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{41}$, $R_{42}$, and $R_{43}$ each, independently of the others, is (i) a hydrogen atom, (ii) a hydroxy group, (iii) an amino group of the formula —$NR_{44}R_{45}$, wherein $R_{44}$ and $R_{45}$ each, independently of the others, is a hydrogen atom, an alkyl group as defined for $R_{41}$, $R_{42}$, and $R_{43}$, an aryl group as defined for $R_{41}$, $R_{42}$, and $R_{43}$, an arylalkyl group as defined for $R_{41}$, $R_{42}$, and $R_{43}$, or an alkylaryl group as defined for $R_{41}$, $R_{42}$, and $R_{43}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges., such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable hindered amine light stabilizers include 2,2,6,6-tetramethyl-4-piperidinol, of the formula

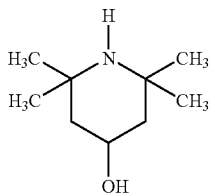

available from Hüls America, Piscataway, N.J., 7,7,9,9-tetramethyl-1,4-dioxa-8-azaspiro[4.5]decane-2-methanol, of the formula

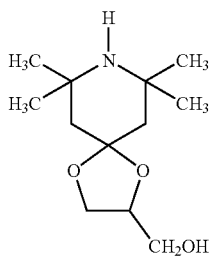

available from Aldrich Chemical Company, Milwaukee, Wis., 2,2,6,6-tetramethyl-4-piperidinamine, of the formula

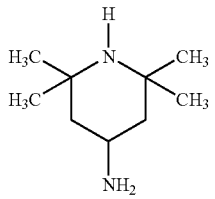

available from Hüls America, Piscataway, N.J., and the like.

Another example of a class of suitable antioxidants and/or UV stabilizers is that of butylated hydroxytoluenes, including (but not limited to) those of the formula

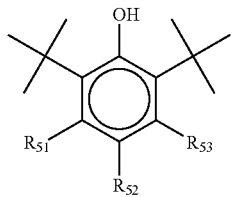

wherein, provided that at least one of $R_{51}$, $R_{52}$, and $R_{53}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{51}$, $R_{52}$, and $R_{53}$ each, independently of the others, is (i) a hydrogen atom, (ii) a hydroxy group, (iii) an amino group of the formula —$NR_{54}R_{55}$, wherein $R_{54}$ and $R_{55}$ each, independently of the others, is a hydrogen atom, an alkyl group as defined for $R_{51}$, $R_{52}$, and $R_{53}$, an aryl group as defined for $R_{51}$, $R_{52}$, and $R_{53}$, an arylalkyl group as defined for $R_{51}$, $R_{52}$, and $R_{53}$, or an alkylaryl group as defined for $R_{51}$, $R_{52}$, and $R_{53}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable butylated hydroxytoluenes include 2,6-di-tert-butyl-4-hydroxymethylphenol, of the formula

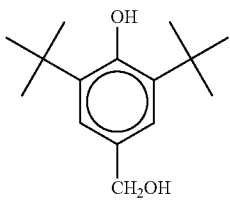

available from TCI America, Portland, Oreg., 3,5-di-tert-butyl-4-hydroxybenzoic acid, of the formula

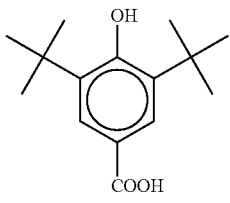

available from TCI America, Portland, Oreg., and the like.

Another example of a class of suitable antioxidants and/or UV stabilizers is that of diaromatic secondary amines, including (but not limited to) those of the formula

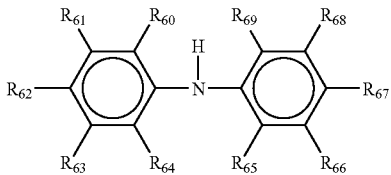

wherein, provided that at least one of $R_{60}$, $R_{61}$, $R_{62}$, $R_{63}$, $R_{64}$, $R_{65}$, $R_{66}$, $R_{67}$, $R_{68}$, and $R_{69}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{60}$, $R_{61}$, $R_{62}$, $R_{63}$, $R_{64}$, $R_{65}$, $R_{66}$, $R_{67}$, $R_{68}$, and $R_{69}$ each, independently of the others, is (i) a hydrogen atom, (ii) a hydroxy group, (iii) an amino group of the formula —$NR_{58}R_{59}$, wherein $R_{58}$ and $R_{59}$ each, independently of the others, is a hydrogen atom, an alkyl group as defined for $R_{60}$, $R_{61}$, $R_{62}$, $R_{63}$, $R_{64}$, $R_{65}$, $R_{66}$, $R_{67}$, $R_{68}$, and $R_{69}$, an aryl group as defined for $R_{60}$, $R_{61}$, $R_{62}$, $R_{63}$, $R_{64}$, $R_{65}$, $R_{66}$, $R_{67}$, $R_{68}$, and $R_{69}$, an arylalkyl group as defined for $R_{60}$, $R_{61}$, $R_{62}$, $R_{63}$, $R_{64}$, $R_{65}$, $R_{66}$, $R_{67}$, $R_{68}$, and $R_{69}$, or an alkylaryl group as defined for $R_{60}$, $R_{61}$, $R_{62}$, $R_{63}$, $R_{64}$, $R_{65}$, $R_{66}$, $R_{67}$, $R_{68}$, and $R_{69}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable diaromatic secondary amines include 4,4'-diaminophenylamine, of the formula

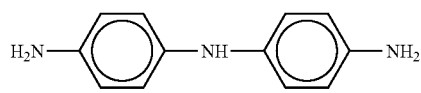

available from Aldrich Chemical Co., N-phenyl-1,4-phenylenediamine, of the formula

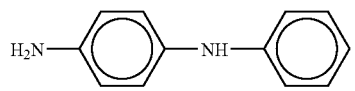

available from Aldrich Chemical Co., and the like.

Another example of a class of suitable antioxidants and/or UV stabilizers is that of diphenyl acrylonitrile esters, including (but not limited to) those of the formula

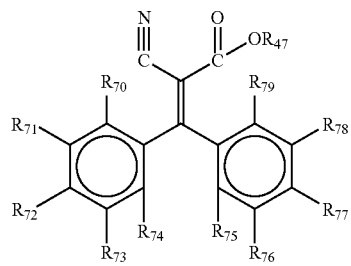

wherein, provided that at least one of $R_{47}$, $R_{70}$, $R_{71}$, $R_{72}$, $R_{73}$, $R_{74}$, $R_{75}$, $R_{76}$, $R_{77}$, $R_{78}$, and $R_{79}$, is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{47}$, $R_{70}$, $R_{71}$, $R_{72}$, $R_{73}$, $R_{74}$, $R_{75}$, $R_{76}$, $R_{77}$, $R_{78}$, and $R_{79}$ each, independently of the others, can be (i) a hydrogen atom, (ii) a hydroxy group, (iii) an amino group of the formula —$NR_{48}R_{49}$, wherein $R_{48}$ and $R_{49}$ each, independently of the others, is a hydrogen atom, an alkyl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, an aryl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, an arylalkyl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, or an alkylaryl group as defined for $R_{47}$, $R_{70}$, $R_{71}$, $R_{72}$, $R_{73}$, $R_{74}$, $R_{75}$, $R_{76}$, $R_{77}$, $R_{78}$, and $R_{79}$, and further wherein $R_{47}$, $R_{70}$, $R_{71}$, $R_{72}$, $R_{73}$, $R_{74}$, $R_{75}$, $R_{76}$, $R_{77}$, $R_{78}$, and $R_{79}$ each, independently of the others, can be (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms; and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable diphenyl acrylonitrile esters include 3-phenyl-3-(p-hydroxyphenyl)-2-carboxyethylacrylonitrile, of the formula

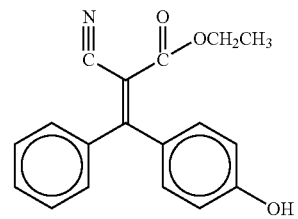

which can be prepared by any desired or effective method, such as by the Knoevenagel condensation of 4-hydroxybenzophenone with a cyanoacetate ester such as ethylcyanoacetate, as described in, for example, Jerry March, *Advanced Organic Chemistry*, 2$^{nd}$ Ed. 1977, p 854–859 (McGraw Hill Inc.), the disclosure of which is totally incorporated herein by reference, and the like.

Another example of a class of suitable antioxidants and/or UV stabilizers is that of cinnamates, including (but not limited to) those of the formula

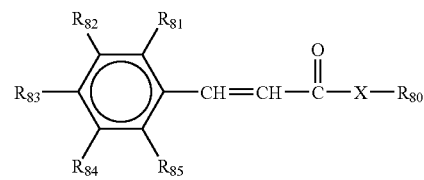

wherein, provided that at least one of $R_{80}$, $R_{81}$, $R_{82}$, $R_{83}$, $R_{84}$, and $R_{85}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, (a) X is (i) an oxygen atom, (ii) a sulfur atom, (iii) a group of the formula —NR$_{86}$—, wherein R$_{86}$ is an alkyl group as defined for R$_{80}$, R$_{81}$, R$_{82}$, R$_{83}$, R$_{84}$, and R$_{85}$, an aryl group as defined for R$_{80}$, R$_{81}$, R$_{82}$, R$_{83}$, R$_{84}$, and R$_{85}$, an arylalkyl group as defined for R$_{80}$, R$_{81}$, R$_{82}$, R$_{83}$, R$_{84}$, and R$_{85}$, or an alkylaryl group as defined for $R_{80}$, $R_{81}$, $R_{82}$, $R_{83}$, $R_{84}$, and $R_{85}$, or (iv) a group of the formula —$CR_{87}R_{57}$—, wherein $R_{87}$ and $R_{57}$ each, independently of the others, is a hydrogen atom, an alkyl group as defined for $R_{80}$, $R_{81}$, $R_{82}$, $R_{83}$, $R_{84}$, and $R_{85}$, an aryl group as defined for $R_{80}$, $R_{81}$, $R_{82}$, $R_{83}$, $R_{84}$, and $R_{85}$, an arylalkyl group as defined for $R_{80}$, $R_{81}$, $R_{82}$, $R_{83}$, $R_{84}$, and $R_{85}$, or an alkylaryl group as defined for $R_{80}$, $R_{81}$, $R_{82}$, $R_{83}$, $R_{84}$, and $R_{85}$, and (b) $R_{80}$, $R_{81}$, $R_{82}$, $R_{83}$, $R_{84}$, and $R_{85}$ each, independently of the others, is (i) a hydrogen atom, (ii) a hydroxy group, (iii) an amino group of the formula —$NR_{88}R_{89}$, wherein $R_{88}$ and $R_{89}$ each, independently of the others, is a hydrogen atom, an alkyl group as defined for $R_{80}$; $R_{81}$, $R_{82}$, $R_{83}$, $R_{84}$, and $R_{85}$, an aryl group as defined for $R_{80}$, $R_{81}$, $R_{82}$, $R_{83}$, $R_{84}$, and $R_{85}$, an arylalkyl group as defined for $R_{80}$, $R_{81}$, $R_{82}$, $R_{83}$, $R_{84}$, and $R_{85}$, or an alkylaryl group as defined for $R_{80}$, $R_{81}$, $R_{82}$, $R_{83}$, $R_{84}$, and $R_{85}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units); wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about −50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable cinnamates include 4-methoxy cinnamic acid, of the formula

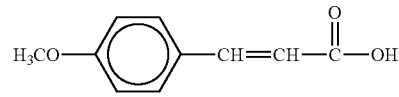

available from Aldrich Chemical Co., and the like.

Another example of a class of suitable antioxidants and/or UV stabilizers is that of trisaryl-1,3,5-triazines, including (but not limited to) those of the formula

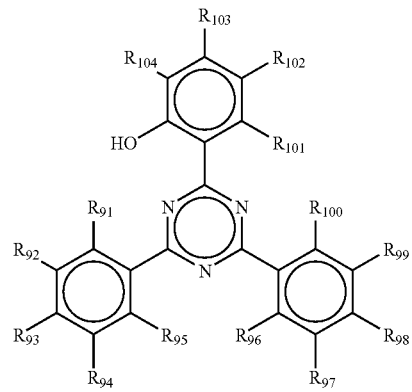

wherein, provided that at least one of $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$ each, independently of the others, is (i) a hydrogen atom, (ii) a hydroxy group, (iii) an amino group of the formula —$NR_{105}R_{106}$, wherein $R_{105}$ and $R_{106}$ each, independently of the others, is a hydrogen atom, an alkyl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, an aryl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, an arylalkyl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, or an alkylaryl group as defined for $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$, (iv) an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (v) an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 14 carbon atoms, although the number of carbon atoms can be outside of these ranges, (vi) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyl or the like, (vii) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyl or the like, (viii) an alkoxy group (including linear, branched, saturated, unsaturated, cyclic, and unsubstituted alkoxy groups, and wherein hetero atoms, such as oxygen, nitrogen, sulfur, silicon, phosphorus, and the like either may or may not be present in the alkoxy group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 50 carbon atoms, and in another embodiment with no more than about 48 carbon atoms, although the number of carbon atoms can be outside of these ranges, (ix) an aryloxy group (including unsubstituted and substituted aryloxy groups, and wherein hetero atoms, such as oxygen, nitrogen, sulfur, silicon, phosphorus, and the like either may or may not be present in the aryloxy group), in one embodiment with at least 5 carbon atoms, and in another embodiment with at least about 6 carbon atoms, and in one embodiment with no more than about 14 carbon atoms, although the number of carbon atoms can be outside of these ranges, (x) an arylalkyloxy group (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as benzyloxy or the like, (xi) an alkylaryloxy group (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 7 carbon atoms, and in another embodiment with at least about 12 carbon atoms, and in one embodiment with no more than about 50 carbon atoms, and in another embodiment with no more than about 24 carbon atoms, although the number of carbon atoms can be outside of these ranges, such as tolyloxy or the like, (xii) a polyalkyleneoxy group (including those wherein the alkyl portions of the repeat alkyleneoxy units are linear, branched, saturated, unsaturated, cyclic, substituted, and unsubstituted, and wherein hetero atoms, such as oxygen, nitrogen, sulfur, silicon, phosphorus, and the like either may or may not be present in the alkyl portions of the repeat alkyleneoxy units), wherein the alkyl portion of each of the repeat alkyleneoxy units in one embodiment has 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as ethylene oxide, propylene oxide, butylene oxide, and the like, and wherein the number of repeat alkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkyleneoxy units can be outside of these ranges, and wherein the individual repeat alkyleneoxy units need not all have the same number of carbon atoms, but can be alternating, random, or block copolymers, such as those of ethylene oxide and propylene oxide, or the like, (xiii) a polyaryleneoxy group (including those wherein the aryl portions of the repeat aryleneoxy units are substituted and unsubstituted, and wherein hetero atoms, such as oxygen, nitrogen, sulfur, silicon, phosphorus, and the like either may or may not be present in the aryl portions of the repeat aryleneoxy units), wherein the aryl portion of each of the repeat aryleneoxy units in one embodiment has 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, such as phenylene oxide, naphthylene oxide, and the like, and wherein the number of repeat aryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat aryleneoxy units can be outside of these ranges, and wherein the individual repeat aryleneoxy units need not all have the same number of carbon atoms, but can be alternating, random, or block copolymers, (xiv) a polyarylalkyleneoxy group (including those wherein the aryl portions and/or the alkyl portions of the repeat arylalkyleneoxy units are substituted and unsubstituted, and wherein hetero atoms, such as oxygen, nitrogen, sulfur, silicon, phosphorus, and the like either may or may not be present in the aryl and/or the alkyl portions of the repeat arylalkyleneoxy units), wherein the arylalkyl portion of each of the repeat arylalkyleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat arylalkyleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat arylalkyleneoxy units can be outside of these ranges, and wherein the individual repeat arylalkyleneoxy units need not all have the same number of carbon atoms, but can be alternating, random, or block copolymers, or (xv) a polyalkylaryleneoxy group (including those wherein the aryl portions and/or the alkyl portions of the repeat alkylaryleneoxy units are substituted and unsubstituted, and wherein hetero atoms, such as oxygen, nitrogen, sulfur, silicon, phosphorus, and the like either may or may not be present in the aryl and/or the alkyl portions of the repeat alkylaryleneoxy units), wherein the arylalkyl portion of each of the repeat alkylaryleneoxy units in one embodiment has 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms, although the number of carbon atoms can be outside of these ranges, and wherein the number of repeat alkylaryleneoxy units is in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the number of repeat alkylaryleneoxy units can be outside of these ranges, and wherein the individual repeat alkylaryleneoxy units need not all have the same number of carbon atoms, but can be alternating, random, or block copolymers, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, and polyalkylaryleneoxy groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring.

Specific examples of suitable trisaryl-1,3,5-triazines include TINUVIN® 405, of the formula

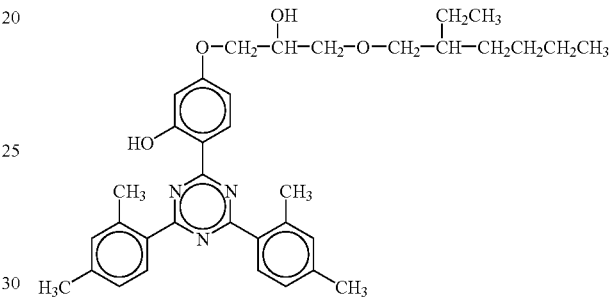

available from Ciba Specialty Chemicals, and the like.

Mixtures of two or more antioxidants and/or UV stabilizers can also be employed.

Any suitable reaction condition for making urethane or urea compounds by condensing alcohols or amines with isocyanates can be used to prepare the antioxidant- or UV stabilizer-containing material. Typically (although not necessarily), the reaction is carried out at elevated temperatures (for example, from about 60 to about 160° C.) in the presence of a urethane reaction catalyst, such as dibutyl tindilaurate, bismuth tris-neodecanoate, cobalt benzoate, lithium acetate, stannous octoate, triethylamine, or the like. In a specific embodiment, the reaction conditions are conducted in an inert atmosphere, such as argon or nitrogen gas or other suitable gases, to prevent oxidizing or yellowing of the reaction products and to prevent undesirable side reactions. The mole ratio of reactants is adjusted so that the isocyanate functionalities are completely consumed in the reaction with a slight molar excess of hydroxyl-substituted or amino-substituted antioxidant or UV stabilizer typically remaining. The reactants can be added together in any order and/or added to the reaction as physical mixtures. If desired, reaction conditions and the order of the addition of reactants can be controlled for several reasons, such as to provide a controlled exothermic reaction, to tailor the distribution of molecules in the antioxidant-containing material, or the like. When doing these adjustments, the different reactivities to isocyanates of alcohols versus amines can be employed, as well as the different reactivities of the two separate isocyanate groups on IPDI. See, for example, J. H. Saunders and K. C. Frisch's "Polyurethanes Part 1, Chemistry" published by Interscience of New York, N.Y. in 1962 and Olin Chemicals' LUXATE® IM isophorone diisocyanate technical product information sheet, which provide further explanation of this chemistry.

The antioxidant- or UV stabilizer-containing material thus prepared is present in the ink in any desired or effective amount, typically at least about 0.1 percent by weight of the ink, preferably at least about 1 percent by weight of the ink, and more preferably at least about 3 percent by weight of the ink, and typically no more than about 99 percent by weight of the ink, preferably no more than about 40 percent by weight of the ink, and more preferably no more than about 15 percent by weight of the ink, although the amount can be outside of these ranges.

The antioxidant- or UV stabilizer-containing material can, if desired, function as the sole ink carrier. Optionally, the antioxidant- or UV stabilizer-containing material can be admixed with other materials to create an ink carrier. Any desired or effective carrier composition can be used. Examples of suitable ink carrier materials include fatty amides, such as monoamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed in the ink carrier composition for inks of the present invention.

Additional suitable phase change ink carrier materials for the present invention include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

In one specific embodiment, the phase change ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 60 percent by weight of the ink, in another embodiment of no more than about 53 percent by weight of the ink, and in yet another embodiment of no more than about 48 percent by weight of the ink, although the amount can be outside of these ranges; (b) a stearyl stearamide wax, present in the ink in an amount in one embodiment of at least about 8 percent by weight of the ink, in another embodiment of at least about 10 percent by weight of the ink, and in yet another embodiment of at least about 12 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the ink in an amount in one embodiment of at least about 10 percent by weight of the ink, in another embodiment of at least about 13 percent by weight of the ink, and in yet another embodiment of at least about 16 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges; (d) a urethane resin derived from the reaction of two equivalents of hydroabietyl alcohol and one equivalent of isophorone diisocyanate, present in the ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

The ink carrier is present in the phase change ink of the present invention in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change ink compositions of the present invention also contain a colorant. Any desired or effective colorant can be employed in the inks of the present invention, including dyes, pigments, mixtures thereof, and the like, provided that the colorant can be dissolved or dispersed in the ink vehicle. The phase change carrier compositions of the current invention can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915–67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks of the present invention. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871 K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991 K (BASF); Paliotol Yellow 1840 (BASF); Novoperm Yellow FGL (Hoechst), Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like.

Also suitable are the colorants disclosed in Copending Application U.S. Ser. No. 10/072,241, filed Feb. 8, 2002, entitled "Phthalocyanine Compositions," Copending Application U.S. Ser. No. 10/072,210, Feb. 8, 2002, entitled "Ink Compositions Containing Phthalocyanines," Copending Application U.S. Ser. No. 10/072,237, filed Feb. 8, 2002, entitled "Methods For Preparing Phthalocyanine Compositions," Copending Application U.S. Ser. No. 10/185,261, filed Jun. 27, 2002, entitled "Processes for Preparing Dianthranilate Compounds and Diazopyridone Colorants," Copending Application U.S. Ser. No. 10/185,994, filed Jun. 27, 2002, entitled "Dimeric Azo Pyridone Colorants," Copending Application U.S. Ser. No. 10/184,269, filed Jun. 27, 2002, entitled "Phase Change Inks Containing Dimeric Azo Pyridone Colorants," Copending Application U.S. Ser. No. 10/185,264, filed Jun. 27, 2002, entitled "Phase Change Inks Containing Azo Pyridone Colorants," Copending Application U.S. Ser. No. 10/186,024, filed Jun. 27, 2002, entitled "Azo Pyridone Colorants," Copending Application U.S. Ser. No. 10/185,597, filed Jun. 27, 2002, entitled "Process for Preparing Substituted Pyridone Compounds," Copending Application U.S. Ser. No. 10/185,828, filed Jun. 27, 2002, entitled "Method for Making Dimeric Azo Pyridone Colorants," Copending Application U.S. Ser. No. 10/186,023, filed Jun. 27, 2002, entitled "Dimeric Azo Pyridone Colorants," Copending Application U.S. Ser. No. 10/184,266, filed Jun. 27, 2002, entitled "Phase Change Inks Containing Dimeric Azo Pyridone Colorants," U.S. application Ser. No. 10/260,146, filed Sep. 27, 2002, entitled "Colorant Compounds," with the named inventors Jeffery H. Banning and C. Wayne Jaeger, and U.S. application Ser. No. 10/260,379, filed Sep. 27, 2002, entitled "Methods for Making Colorant Compounds," with the named inventors C. Wayne Jaeger and Jeffery H. Banning, the disclosures of each of which are totally incorporated herein by reference.

Other ink colors besides the subtractive primary colors can be desirable for applications such as postal marking or industrial marking and labelling using phase change printing, and the present invention is applicable to these needs. Further, infrared (IR) or ultraviolet (UV) absorbing dyes can also be incorporated into the inks of the present invention for use in applications such as "invisible" coding or marking of products. Examples of such infrared and ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275,647, U.S. Pat. No. 5,208,630, U.S. Pat. No. 5,202,265, U.S. Pat. No. 5,271,764, U.S. Pat. No. 5,256,193, U.S. Pat. No. 5,385,803, and U.S. Pat. No. 5,554,480, the disclosures of each of which are totally incorporated herein by reference.

In a specific embodiment, the colorant is an isocyanate-derived colored resin as disclosed in, for example, U.S. Pat. No. 5,780,528 and U.S. Pat. No. 5,919,839, the disclosures of each of which are totally incorporated herein by reference. In this embodiment, the colorant is the reaction product of a hydroxyl-substituted or primary or secondary amino-substituted chromophore with an isocyanate. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Specific examples of suitable isocyanates include those listed hereinabove as being suitable for reaction with the hydroxyl-substituted or amino-substituted antioxidant. Examples of suitable hydroxyl-substituted and primary or secondary amino-substituted chromophores include those disclosed in, for example, U.S. Pat. No. 3,157,633, U.S. Pat. No. 3,927,044, U.S. Pat. No. 3,994,835, U.S. Pat. No. 4,102,644, U.S. Pat. No. 4,113,721, U.S. Pat. No. 4,132,840, U.S. Pat. No. 4,137,243, U.S. Pat. No. 4,170,564, U.S. Pat. No. 4,284,729, U.S. Pat. No. 4,507,407, U.S. Pat. No. 4,640,690, U.S. Pat. No. 4,732,570, U.S. Pat. No. 4,751,254, U.S. Pat. No. 4,751,254, U.S. Pat. No. 4,761,502, U.S. Pat. No. 4,775,748, U.S. Pat. No. 4,812,141, U.S. Pat. No. 4,846,846, U.S. Pat. No. 4,871,371, U.S. Pat. No. 4,912,203, U.S. Pat. No. 4,978,362, U.S. Pat. No. 5,043,013, U.S. Pat. No. 5,059,244, U.S. Pat. No. 5,149,800, U.S. Pat. No. 5,177,200, U.S. Pat. No. 5,270,363, U.S. Pat. No. 5,290,921, and U.S. Pat. No. 5,731,398, the disclosures of each of which are totally incorporated herein by reference. Hydroxyl-containing and primary or secondary amino-containing colorants from the classes of Color Index (C.I.) Solvent Dyes, Disperse Dyes, modified Acid and Direct Dyes, Basic Dyes, Sulphur Dyes, Vat Dyes, and the like can also be used.

The colorant is present in the phase change ink of the present invention in any desired or effective amount to obtain the desired color or hue, typically at least about 0.1 percent by weight of the ink, preferably at least about 0.2 percent by weight of the ink, and more preferably at least about 0.5 percent by weight of the ink, and typically no more than about 50 percent by weight of the ink, preferably no more than about 20 percent by weight of the ink, and more preferably no more than about 10 percent by weight of the ink, although the amount can be outside of these ranges.

In another specific embodiment of the present invention, the colorant is incorporated into the molecule containing the antioxidant or UV stabilizer. In this embodiment, the ink comprises the reaction product of (i) a diisocyanate, (ii) an antioxidant and/or UV stabilizer molecule having thereon (A) at least one isocyanate-reactive hydroxyl group and/or (B) at least one isocyanate-reactive primary or secondary amino group, and (iii) a chromophore having thereon (A) at least one isocyanate-reactive hydroxyl group and/or (B) at least one isocyanate-reactive primary or secondary amino group. As described hereinabove, a diisocyanate reacts with an alcohol to form a diurethane as follows:

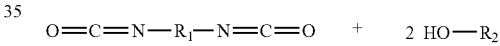

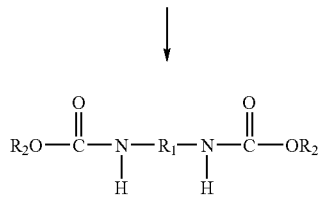

If a mixture of alcohols is employed, such as $R_{2a}$—OH wherein $R_{2a}$ represents a colorant moiety, and $R_{2b}$—OH wherein $R_{2b}$ represents an antioxidant and/or UV stabilizer moiety, and if the stoichiometric ratio of $R_{2a}$—OH to $R_{2b}$—OH is selected so as to obtain the desired product, a diurethane can be obtained as follows:

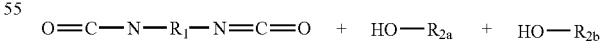

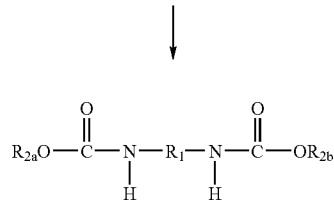

A diisocyanate reacts with an amine to form a diurea as follows:

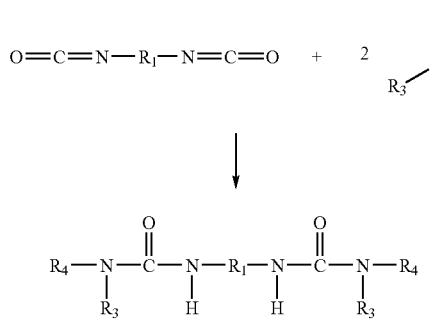

If a mixture of amines is employed, such as $R_{3a}$—NH—$R_{4a}$ wherein $R_{3a}$ and/or $R_{4a}$ represents a colorant moiety, and $R_{3b}$—NH—$R_{4b}$ wherein $R_{3b}$ and/or $R_{4b}$ represents an antioxidant and/or UV stabilizer moiety, and if the stoichiometric ratio of $R_{3a}$—NH—$R_{4a}$ to $R_{3b}$—NH—$R_{4b}$ is selected so as to obtain the desired product, a diurethane can be obtained as follows:

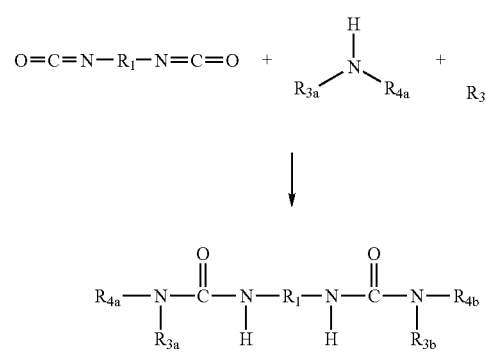

A diisocyanate reacts with a mixture of an amine and an alcohol to form mixtures of products as follows:

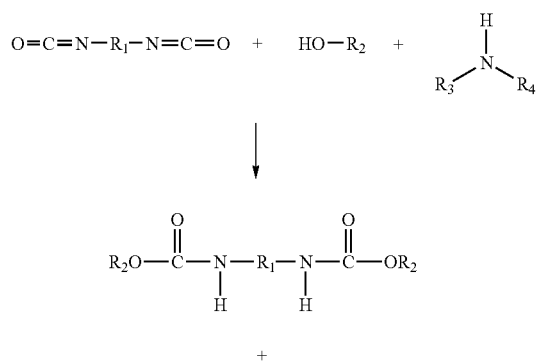

-continued $$R_2O-\overset{O}{\underset{}{C}}-\underset{H}{N}-R_1-\underset{H}{N}-\overset{O}{\underset{}{C}}-\underset{R_3}{N}-R_4$$

+

$$R_4-\underset{R_3}{N}-\overset{O}{\underset{}{C}}-\underset{H}{N}-R_1-\underset{H}{N}-\overset{O}{\underset{}{C}}-\underset{R_3}{N}-R_4$$

The above methods can be employed here, using mixtures of alcohols of the formulae $R_{2a}$—OH and $R_{2b}$—OH or using mixtures of amines of the formulae $R_{3a}$—NH—$R_{4a}$ and $R_{3b}$—NH—$R_{4b}$. In addition, in one embodiment, $R_2$ is selected to be a colorant moiety and $R_3$ and/or $R_4$ is selected to be an antioxidant and/or UV stabilizer moiety. In another embodiment, $R_2$ is selected to be an antioxidant and/or UV stabilizer moiety and $R_3$ and/or $R_4$ is selected to be a colorant moiety. Additional information on such reactions is disclosed in, for example, U.S. Pat. No. 5,780,528, the disclosure of which is totally incorporated herein by reference.

The inks of the present invention can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The inks of the present invention can also optionally contain other materials in addition to the reaction product of the isocyanate and the antioxidant or UV stabilizer as components of the phase change ink carrier. The phase change carrier composition is typically designed for use in either a direct printing mode or an indirect or offset printing transfer system.

In the direct printing mode, the phase change carrier composition in specific embodiments contains one or more materials that enable the phase change ink (1) to be applied in a thin film of uniform thickness on the final recording substrate (such as paper, transparency material, or the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in specific embodiments exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

The ink compositions of the present invention typically have melting points no lower than about 50° C., preferably no lower than about 70° C., and more preferably no lower than about 80° C., and typically have melting points no higher than about 160° C., preferably no higher than about 140° C., and more preferably no higher than about 100° C., although the melting point can be outside of these ranges.

The ink compositions of the present invention generally have melt viscosities at the jetting temperature (typically no lower than about 75° C., preferably no lower than about 100° C., and more preferably no lower than about 120° C., and typically no higher than about 180° C., preferably no higher than about 150° C., and more preferably no higher than about 130° C., although the jetting temperature can be outside of these ranges) typically of no more than about 30 centipoise, preferably no more than about 20 centipoise, and even more preferably no more than about 15 centipoise, and typically of no less than about 2 centipoise, preferably no less than about 5 centipoise, and even more preferably no less than about 7 centipoise, although the melt viscosity can be outside of these ranges. Since image hardness tend to drop with lower viscosities, it is preferred that the viscosity be as low as possible while still retaining the desired degree of image hardness.

The ink compositions of the present invention can be prepared by any desired or suitable method. For example, the ink ingredients can be mixed together, followed by heating, typically to a temperature of from about 100 to about 140° C., although the temperature can be outside of this range, and stirring until a homogeneous ink composition is obtained, followed by cooling the ink to ambient temperature (typically from about 20 to about 25° C.). The inks of the present invention are solid at ambient temperature.

The inks of the present invention can be employed in apparatus for direct printing ink jet processes and in indirect (offset) printing ink jet applications. Another embodiment of the present invention is directed to a process which comprises incorporating an ink of the present invention into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment of the present invention is directed to a process which comprises incorporating an ink of the present invention into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks of the present invention can also be employed in other hot melt printing processes, such as hot melt acoustic ink jet printing, hot melt thermal ink jet printing, hot melt continuous stream or deflection ink jet printing, or the like. Phase change inks of the present invention can also be used in printing processes other than hot melt ink jet printing processes, such as hot melt gravure printing, hot melt medical imaging printing, or the like.

Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

To a 4-neck 1-liter kettle equipped with trubore stirrer, thermocouple temperature controller, constant pressure addition funnel, and $N_2$ inlet was added 22.9 grams of cyan polymeric dye (Experimental Blue III 9495-29, obtained from available from Milliken Chemical Co.), 24.1 grams of 2,4-dihydroxybenzophenone (obtained from Aldrich Chemical Co.), 77 grams of IGEPAL® CA 210 (octylphenol ethoxylate, obtained from Rhone-Poulenc Co), and 5 drops of dibutyltindilaurate (obtained from Aldrich Chemical Co.). The reaction mixture thus prepared was heated to 100° C. with stirring. 50 grams of isophorone diisocyanate (obtained from Aldrich Chemical Co.) was then added to the constant pressure addition funnel and added slowly to the reaction mixture, allowing the reaction to exotherm to 135° C. and maintaining the reaction mixture at that temperature for 3 hours. An FT-IR spectrum of the resulting product was obtained to ensure that all of the isocyanate (NCO) was consumed. The absence (or disappearance) of a peak at about 2285 $cm^{-1}$ (NCO) and the appearance (or increase in magnitude) of peaks at about 3465–3440 $cm^{-1}$, 1705–1635 $cm^{-1}$, and about 1515–1555 $cm^{-1}$ corresponding to urea frequencies, and at about 3450–3200 $cm^{-1}$ and 1740–1680 $cm^{-1}$, corresponding to urethane frequencies, confirmed consumption of the isocyanate. The colored clear resinous material thus obtained was then poured into aluminum tins and allowed to cool. This final colored resin product can be used as obtained.

EXAMPLE II

To a 4-neck 1-liter kettle equipped with trubore stirrer, thermocouple temperature controller, constant pressure addition funnel, and $N_2$ inlet was added 77.1 grams of 2,4-dihydroxybenzophenone (obtained from Aldrich Chemical Co.), 5 drops of dibutyltindilaurate (obtained from Aldrich Chemical Co.), and 40 grams of isophorone diisocyanate (obtained from Aldrich Chemical Co.). The reaction mixture thus prepared was heated to 150° C. with stirring and maintained at that temperature for 3 hours. An additional 52 grams of 2,4-dihydroxybenzophenone was then added over 4 hours. An FT-IR spectrum of the resulting product was obtained to ensure that all of the isocyanate (NCO) was consumed. The absence (or disappearance) of a peak at about 2285 $cm^{-1}$ (NCO) and the appearance (or increase in magnitude) of peaks at about 3465–3440 $cm^{-1}$, 1705–1635 $cm^{-1}$, and about 1515–1555 $cm^{-1}$ corresponding to urea frequencies, and at about 3450–3200 $cm^{-1}$ and 1740–1680 $cm^{-1}$, corresponding to urethane frequencies, confirmed consumption of the isocyanate. The colored clear resinous material thus obtained was then poured into aluminum tins and allowed to cool. This final resin product was characterized by a viscosity of about 195 centipoise as measured by a Ferranti-Shirley cone plate viscometer at about 140° C.

EXAMPLE III

To a 4-neck 1-liter kettle equipped with trubore stirrer, thermocouple temperature controller, constant pressure addition funnel, and $N_2$ inlet was added 75.0 grams of NORBLOC® 6000 (obtained from Normaco Inc.), 5 drops of dibutyltindilaurate (obtained from Aldrich Chemical Co.), and 32.6 grams of isophorone diisocyanate (obtained from Aldrich Chemical Co.). The reaction mixture thus prepared was allowed to exotherm, and was subsequently heated to 140° C. with stirring and maintained at that temperature for 3 hours. An FT-IR spectrum of the resulting product was obtained to ensure that all of the isocyanate (NCO) was consumed. The absence (or disappearance) of a peak at about 2285 $cm^{-1}$ (NCO) and the appearance (or increase in magnitude) of peaks at about 3465–3440 $cm^{-1}$, 1705–1635 $cm^{-1}$, and about 1515–1555 $cm^{-1}$ corresponding to urea frequencies, and at about 3450–3200 $cm^{-1}$ and 1740–1680 $cm^{-1}$, corresponding to urethane frequencies, confirmed consumption of the isocyanate. The colored clear resinous material thus obtained was then poured into aluminum tins and allowed to cool. This final colorless resin product can be used as obtained.

EXAMPLE IV

To a 50 mL reaction vessel equipped with a TEFLON® coated magnet and situated in an oil bath at about 150° C. was added 14.1 grams of 2,2,6,6-tetramethyl-4-piperidineamine (obtained from Hüls America) and 10 grams of isophorone diisocyanate (obtained from Aldrich Chemical Co.). The reaction mixture thus prepared was heated to 150° C. with stirring. After a short time it was seen that this di-urea had a very high melting point, and the oil bath temperature was increased to about 180° C. and maintained at that temperature for 3 hours. An FT-IR spectrum of the resulting product was obtained to ensure that all of the isocyanate (NCO) was consumed. The absence (or disappearance) of a peak at about 2285 $cm^{-1}$ (NCO) and the appearance (or increase in magnitude) of peaks at about 3465–3440 $cm^{-1}$, 1705–1635 $cm^{-1}$, and about 1515–1555 $cm^{-1}$ corresponding to urea frequencies, and at about 3450–3200 $cm^{-1}$ and 1740–1680 $cm^{-1}$, corresponding to urethane frequencies, confirmed consumption of the isocyanate. The colored clear resinous material thus obtained was poured into tins and allowed to cool to room temperature. This final colorless resin product can be used as obtained.

EXAMPLE V

To a 50 mL reaction vessel equipped with a TEFLON® coated magnet and situated in an oil bath at about 150° C. is added 10.0 grams of 4,4-diaminophenylamine (available from Aldrich Chemical Co.) and 29.7 grams of octadecyl isocyanate (available from Aldrich Chemical Co.). The reaction mixture thus prepared is heated to about 150° C. with stirring and maintained at that temperature for 3 hours. An FT-IR spectrum of the product is obtained to ensure that all of the isocyanate (NCO) is consumed. The absence (or disappearance) of a peak at about 2285 $cm^{-1}$ (NCO) and the appearance (or increase in magnitude) of peaks at about 3465–3440 $cm^{-1}$, 1705–1635 $cm^{-1}$, and about 1515–1555 $cm^{-1}$ corresponding to urea frequencies, and at about 3450–3200 $cm^{-1}$ and 1740–1680 $cm^{-1}$, corresponding to urethane frequencies, confirm consumption of the isocyanate. The product thus obtained is poured into tins and allowed to cool to room temperature. This final product can be used as obtained.

EXAMPLE VI

To a 100 mL 1-neck roundbottom flask equipped with reflux condenser, Dean Stark trap, and TEFLON® coated magnet and situated in an oil bath at about 150° C. is added 10.0 grams of 4-hydroxybenzophenone (available from Aldrich Chemical Co.) and 5.3 grams of ethylcyanoacetate (available from Aldrich Chemical Co.). The reaction mixture thus obtained is refluxed with stirring, allowing the reaction to continue overnight. The hydroxyl-containing diphenylacrylonitrile product is then cooled, allowed to precipitate, and collected. 10 grams of the hydroxyl-containing diphenylacrylonitrile product, 1 drop of dibutyltindilaurate (available from Aldrich Chemical Co.), and 3.8 grams of Isophorone diisocyanate (available from Aldrich Chemical Co.) are combined and the reaction mixture thus prepared is heated to 150° C. with stirring and maintained at that temperature for 3 hours. An additional 0.5 grams of diphenylacrylonitrile product is then added and the reaction mixture is allowed to heat and stir for an additional 2 hours. An FT-IR spectrum of the product is obtained to ensure that all of the isocyanate (NCO) is consumed. The absence (or disappearance) of a peak at about 2285 cm$^{-1}$ (NCO) and the appearance (or increase in magnitude) of peaks at about 3465–3440 cm$^{-1}$, 1705–1635 cm$^{-1}$, and about 1515–1555 cm$^{-1}$ corresponding to urea frequencies, and at about 3450–3200 cm$^{-1}$ and 1740–1680 cm$^{-1}$, corresponding to urethane frequencies, confirm consumption of the isocyanate. The resinous material thus obtained is poured into tins and allowed to cool to room temperature. This final resin product can be used as obtained.

EXAMPLE VII

To a 50 mL reaction vessel equipped with a TEFLON® coated magnet and situated in an oil bath at about 150° C. is added 20.0 grams of 4-methoxy cinnamic acid (available from Aldrich Chemical Co.), 12.5 grams of isophorone diisocyanate (available from Aldrich Chemical Co.), and 1 drop of dibutyltindilaurate (available from Aldrich Chemical Co.). The reaction mixture thus prepared is heated to about 150° C. with stirring and maintained at that temperature for 3 hours. An FT-IR spectrum of the product is obtained to ensure that all of the isocyanate (NCO) is consumed. The absence (or disappearance) of a peak at about 2285 cm$^{-1}$ (NCO) is monitored. The molten product thus obtained is then poured into tins and allowed to cool to room temperature. This final product can be used as obtained.

EXAMPLE VIII

To a 50 mL reaction vessel equipped with a TEFLON® coated magnet and situated in an oil bath at about 150° C. is added 30.0 grams of TINUVIN® 405 (available from Ciba Specialty Chemicals), 5.7 grams of isophorone diisocyanate (available from Aldrich Chemical Co.), and 1 drop of dibutyltindilaurate (available from Aldrich Chemical Co.). The reaction mixture thus prepared is heated to about 150° C. with stirring and maintained at that temperature for 3 hours. An FT-IR spectrum of the product is obtained to ensure that all of the isocyanate (NCO) is consumed. The absence (or disappearance) of a peak at about 2285 cm$^{-1}$ (NCO) and the appearance (or increase in magnitude) of peaks at about 3465–3440 cm$^{-1}$, 1705–1635 cm$^{-1}$, and about 1515–1555 cm$^{-1}$ corresponding to urea frequencies, and at about 3450–3200 cm$^{-1}$ and 1740–1680 cm$^{-1}$, corresponding to urethane frequencies, confirm consumption of the isocyanate. The molten product thus obtained is poured into tins and allowed to cool to room-temperature. This final product can be used as obtained.

EXAMPLE IX

Ink compositions were prepared containing stearyl stearamide wax (KEMAMIDE® S-180, obtained from Crompton Corporation, Greenwich, Conn.), polyethylene wax (POLYWAX® 850, obtained from Baker Petrolite, Tulsa, Okla.), a first resin ("Resin 1", prepared as described in Example 2 of U.S. Pat. No. 5,783,658, the disclosure of which is totally incorporated herein by reference), a second resin ("Resin 2", prepared as described in Example 5 of U.S. Pat. No. 5,783,658), Solvent Red 127 dye (INTERPLAST PINK 5GLB, obtained from Crompton and Knowles Co., Reading, Pa.), Solvent Red 49 dye (NEPTUNE RED BASE NB 543 LD, obtained from BASF Co., Rensselaer, N.Y.), dodecyl benzene sulfonic acid ("DDBSA", BioSoft S-101, obtained from Stepan Company, Northfield, Ill.), and NAUGUARD® 445 antioxidant (obtained from Uniroyal Chemical Co., Middlebury, Conn.). Ink 1 was a control (comparative) ink containing no antioxidant, Ink 2 was a control (comparative) ink containing a commercially available antioxidant ("HOOB", 2-hydroxy-4-n-octoxybenzophenone, obtained as MARK 1413 from the Argus Division of Witco Corp.), and Ink 3 was an ink according to the present invention containing a resin prepared as described in Example II. The inks contained the ingredients in the following relative amounts (expressed in parts by weight):

| Ingredient | Ink 1 | Ink 2 | Ink 3 |
|---|---|---|---|
| S-180 | 45.30 | 43.94 | 45.30 |
| POLYWAX 850 | 5.00 | 4.85 | 5.00 |
| Resin 1 | 23.35 | 22.65 | 20.85 |
| Resin 2 | 23.35 | 22.65 | 20.85 |
| SR 127 | 0.30 | 0.29 | 0.30 |
| SR 49 | 2.00 | 1.94 | 2.00 |
| DDBSA | 0.50 | 0.49 | 0.50 |
| NAUGUARD 445 | 0.20 | 0.19 | 0.20 |
| HOOB | — | 3.0 | — |
| Example II resin | — | — | 5 |

These ingredients were combined in the proportions listed to make three inks in amounts of about 500 grams each. The inks were prepared as follows: The uncolored ingredients were weighed out and combined in 1 liter stainless steel beakers. The beakers were then placed in an oven at about 130° C. for several hours until the materials were fully melted. Thereafter, the beakers were placed in heating mantles at 130° C. and mechanically stirred for about 0.5 hour to mix thoroughly the ink base. The dyes and UV stabilizing materials were then added and the ink was stirred for an additional 1 hour. At that point, the finished formulations were filtered through a Mott apparatus using #3 Whatman filter paper. The finished inks were then poured into sticks and placed in a TEKTRONIX® PHASER® 340 printer. Solid fill magenta prints were made of each ink and the prints were evaluated for color loss after exposure to a 2500-W xenon arc lamp in an Atlas Fade-Ometer (Atlas Electric Devices Co., Chicago, Ill.) per ASTM G-26. The ΔE values were measured on an ACS® colorimeter (from Applied Color Systems Inc.) in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall calorimetric performance of the inks, measurement data were reduced, via tristimulus integration, following ASTM E308 (Standard Method for Computing the Colors of Objects using the CIE System) in order to calculate the 1976 CIE L* (Lightness), a* (redness-greenness), and b* (yellowness-blueness) CIELAB values for each phase change ink sample. Color differences were determined following ASTM D2244-89 (Standard Test Method for Calculation of Color Differences From instrumentally Measured Color Coordinates) $\Delta E=[(L^*_1-L^*_2)^2+(a^*_1-a^*_2)^2+(b^*_1-b^{*2})^2]^{1/2}$. The table below shows the values of $\Delta E$ indicating the change in color values:

|    | Ink 1 | Ink 2 | Ink 3 |
|----|-------|-------|-------|
| $\Delta E$ | 38 | 22 | 8 |

As the data indicate, the ink containing the resin according to the present invention exhibited substantially improved lightfastness compared to both the ink containing no UV absorber and to the ink containing a conventional UV absorber.

It is believed that similar results will be obtained if this process is repeated with the resins of Examples I, III, IV, V, VI, VII, and VIII.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising (a) a colorant and (b) the reaction product of (i) an isocyanate and (ii) an antioxidant or UV stabilizer molecule having thereon (A) at least one isocyanate-reactive hydroxyl group and/or (B) at least one isocyanate-reactive primary or secondary amino group, wherein the antioxidant or UV stabilizer molecule is (I) of the formula

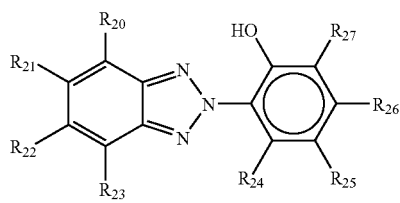

wherein, provided that at least one of $R_{20}$, $R_{21}$, $R_{23}$, $R_{23}$, $R_{24}$, $R_{25}$, $R_{26}$, and $R_{27}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy isocyanate-reactive hydroxy-substituted polyalkyleneoxide group, an isocyanate-reactive amino-substituted polyalkyleneoxide group, an isocyanate-reactive hydro-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{20}$, $R_{21}$, $R_{23}$, $R_{23}$, $R_{24}$, $R_{25}$, $R_{26}$, and $R_{27}$ each, independently of the others, is (i) a hydrogen atom, (ii) a hydroxy group, (iii) an amino group of the formula —$NR_{28}R_{29}$, wherein $R_{28}$ and $R_{29}$ each, independently of the others, is a hydrogen atom, an alkyl group, an aryl group, an arylalkyl group, or an alkylaryl group, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group, (II) a butylated hydroxytoluene, (III) a diaromatic secondary amine, (IV) a diphenyl acrylonitrile ester, (V) a cinnamate, (VI) a trisaryl-1,3,5-triazine, or (VII) mixtures thereof.

2. An ink composition according to claim 1 wherein the isocyanate is a monoisocyanate.

3. An ink composition according to claim 2 wherein the monoisocyanate is octadecylisocyanate; hexadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyante; or mixtures thereof.

4. An ink composition according to claim 1 wherein the isocyanate is a diisocyanate.

5. An ink composition according to claim 4 wherein the diisocyanate is isophorone diisocyanate; toluene diisocyanate; diphenylmethane-4,4'-diisocyanate; hydrogenated diphenylmethane-4,4'-diisocyanate; tetra-methyl xylene diisocyanate; hexamethylene-1,6-diisocyanate; hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; cyclohexylene diisocyanate or an isomer thereof; a uretidione dimer of hexamethylene-1,6-diisocyanate; or mixtures thereof.

6. An ink composition according to claim 1 wherein the isocyanate is a triisocyanate or a polyisocyanate.

7. An ink composition according to claim 1 wherein the ink further comprises a phase change ink carrier.

8. An ink composition according to claim 7 wherein the phase change ink carrier comprises a monoamide, a tetra-amide, or a mixture thereof.

9. An ink composition according to claim 7 wherein the phase change ink carrier comprises (a) stearyl stearamide, (b) a dimer acid based tetra-amide that is the reaction product of dimer acid, ethylene diamine, and stearic acid, or (c) mixtures thereof.

10. An ink composition according to claim 7 wherein the phase change ink carrier comprises (a) stearyl stearamide, (b) a dimer acid based tetra-amide that is the reaction product of dimer acid, ethylene diamine, and a carboxylic acid having at least about 36 carbon atoms, or (c) mixtures thereof.

11. An ink composition according to claim 10 wherein the carboxylic acid has at least about 40 carbon atoms, and wherein the carboxylic acid has no more than about 200 carbon atoms.

12. An ink composition according to claim 7 wherein the phase change ink carrier comprises an isocyanate-derived material.

13. An ink composition according to claim 7 wherein the phase change ink carrier comprises a urethane isocyanate-derived material, a urea isocyanate-derived material, a urethane/urea isocyanate-derived material, or mixtures thereof.

14. An ink composition according to claim 7 wherein the phase change ink carrier comprises a mixture of one or more amides and one or more isocyanate-derived materials.

15. An ink composition according to claim 7 wherein the phase change ink carrier comprises one or more materials selected from the group consisting of paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, Ionomers, and mixtures thereof.

16. An ink composition according to claim 7 wherein the ink carrier comprises (a) a polyethylene wax, (b) a stearyl stearamide wax, (c) a dimer acid based tetra-amide that is the reaction product of dimer acid, ethylene diamine, and a carboxylic acid having at least about 36 carbon atoms, (d) a urethane resin derived from the reaction of two equivalents of hydroabietyl alcohol and one equivalent of isophorone diisocyanate, (e) a urethane resin that is the adduct of three equivalents of stearyl isocyanate and a glycerol-based alcohol, and (f) an antioxidant.

17. An ink composition according to claim 7 wherein the ink carrier comprises (a) a polyethylene wax in an amount of at least about 25 percent by weight of the ink and in an amount of no more than about 60 percent by weight of the ink, (b) a stearyl stearamide wax in an amount of at least about 8 percent by weight of the ink and in an amount of no more than about 32 percent by weight of the ink, (c) a dimer acid based tetra-amide that is the reaction product of dimer acid, ethylene diamine, and a carboxylic acid having at least about 36 carbon atoms in an amount of at least about 10 percent by weight of the ink and in an amount of no more than about 32 percent by weight of the ink, (d) a urethane resin derived from the reaction of two equivalents of hydroabletyl alcohol and one equivalent of isophorone diisocyanate in an amount of at least about 6 percent by weight of the ink and in an amount of no more than about 16 percent by weight of the ink, (e) a urethane resin that is the adduct of three equivalents of stearyl isocyanate and a glycerol-based alcohol in an amount of at least about 2 percent by weight of the ink and in an amount of no more than about 13 percent by weight of the ink, and (f) an antioxidant in an amount of at least about 0.01 percent by weight of the ink and in an amount of no more than about 1 percent by weight of the ink.

18. An ink according to claim 1 wherein the antioxidant or UV stabilizer molecule is of the formula

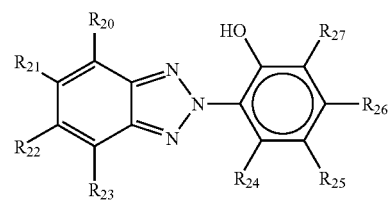

wherein, provided that at least one of $R_{20}$, $R_{21}$, $R_{23}$, $R_{23}$, $R_{24}$, $R_{25}$, $R_{26}$, and $R_{27}$ is an isocyanate-reactive hydroxy group, an isocyanate-reactive amino group, an isocyanate-reactive hydroxy-substituted alkyl group, an isocyanate-reactive amine-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{20}$, $R_{21}$, $R_{23}$, $R_{23}$, $R_{24}$, $R_{25}$, $R_{26}$, and $R_{27}$ each, independently of the others, is (i) a hydrogen atom, (ii) a hydroxy group, (iii) an amino group of the formula —$NR_{28}R_{29}$, wherein $R_{28}$ and $R_{29}$ each, independently of the others, is a hydrogen atom, an alkyl group, an aryl group, an arylalkyl group, or an alkylaryl group, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group.

19. An ink composition according to claim 18 wherein the antioxidant or UV stabilizer molecule is 3-(2H-benzotriazol-2-yl)-4-hydroxyphenethyl alcohol, 2-(2H-benzotriazol-2-yl)-4-(1-hydroxyethyl)phenol, or mixtures thereof.

20. An ink according to claim 1 wherein the antioxidant or UV stabilizer molecule is a butylated hydroxytoluene.

21. An ink composition according to claim 20 wherein the antioxidant or UV stabilizer molecule is of the formula

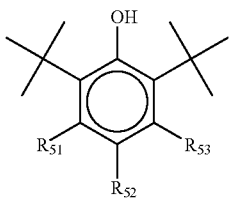

wherein, provided that at least one of $R_{51}$, $R_{52}$, and $R_{53}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{51}$, $R_{52}$, and $R_{53}$ each, independently of the others, is (i) a hydrogen atom, (ii) a hydroxy group, (iii) an amino group of the formula —$NR_{54}R_{55}$, wherein $R_{54}$ and $R_{55}$ each, independently of the others, is a hydrogen atom, an alkyl group, an aryl group, an arylalkyl group, or an alkylaryl group, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group.

22. An ink composition according to claim 20 wherein the antioxidant or UV stabilizer molecule is 2,6-di-tert-butyl-4-hydroxymethylphenol, 3,5-di-tert-butyl-4-hydroxybenzoic acid, or mixtures thereof.

23. An ink according to claim 1 wherein the antioxidant or UV stabilizer molecule is a diaromatic secondary amine.

24. An ink composition according to claim 23 wherein the antioxidant or UV stabilizer molecule is of the formula

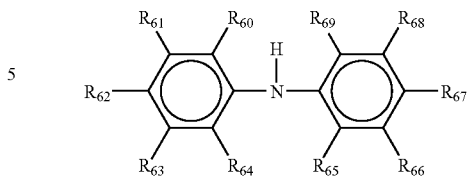

wherein, provided that at least one of $R_{60}$, $R_{61}$, $R_{62}$, $R_{63}$, $R_{64}$, $R_{65}$, $R_{66}$, $R_{67}$, $R_{68}$, and $R_{69}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{60}$, $R_{61}$, $R_{62}$, $R_{63}$, $R_{64}$, $R_{65}$, $R_{66}$, $R_{67}$, $R_{68}$, and $R_{69}$ each, independently of the others, is (i) a hydrogen atom, (ii) a hydroxy group, (iii) an amino group of the formula —$NR_{58}R_{59}$, wherein $R_{58}$ and $R_{59}$ each, independently of the others, is a hydrogen atom, an alkyl group, an aryl group, an arylalkyl group, or an alkylaryl group, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group.

25. An ink composition according to claim 23 wherein the antioxidant or UV stabilizer molecule is 4,4'-diaminophenylamine, N-phenyl-1,4-phenylenediamine, or mixtures thereof.

26. An ink according to claim 1 wherein the antioxidant or UV stabilizer molecule is a diphenyl acrylonitrile ester.

27. An ink composition according to claim 26 wherein the antioxidant or UV stabilizer molecule is of the formula

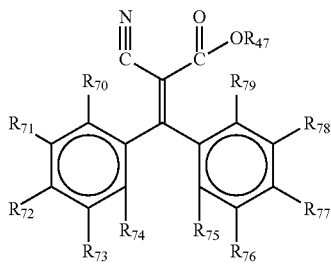

wherein, provided that at least one of $R_{47}$, $R_{70}$, $R_{71}$, $R_{72}$, $R_{73}$, $R_{74}$, $R_{75}$, $R_{76}$, $R_{77}$, $R_{78}$, and $R_{79}$, is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{47}$, $R_{70}$, $R_{71}$, $R_{72}$, $R_{73}$, $R_{74}$, $R_{75}$, $R_{76}$, $R_{77}$, $R_{78}$, and $R_{79}$ each, independently of the others, can be (i) a hydrogen atom, (ii) a hydroxy group, (iii) an amino group of the formula —$NR_{48}R_{49}$, wherein $R_{48}$ and $R_{49}$ each, independently of the others, is a hydrogen atom, an alkyl group, an aryl group, an arylalkyl group, or an alkylaryl group, and further wherein $R_{47}$, $R_{70}$, $R_{71}$, $R_{72}$, $R_{73}$, $R_{74}$, $R_{75}$, $R_{76}$, $R_{77}$, $R_{78}$, and $R_{79}$ each, independently of the others, can be (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group.

28. An ink composition according to claim 26 wherein the antioxidant or UV stabilizer molecule is 3-phenyl-3-(p-hydroxyphenyl)-2-carboxyethyl-acrylonitrile.

29. An ink according to claim 1 wherein the antioxidant or UV stabilizer molecule is a cinnamate.

30. An ink composition according to claim 29 wherein the antioxidant or UV stabilizer molecule is of the formula

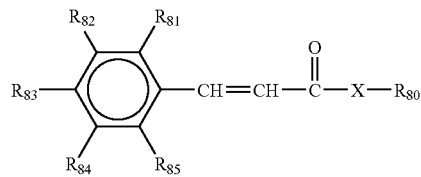

wherein, provided that at least one of $R_{80}$, $R_{81}$, $R_{82}$, $R_{83}$, $R_{84}$, and $R_{85}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, (a) X is (i) an oxygen atom, (ii) a sulfur atom, (iii) a group of the formula —$NR_{86}$—, wherein $R_{86}$ is an alkyl group, an aryl group, an arylalkyl group, or an alkylaryl group, or (iv) a group of the formula —$CR_{87}R_{57}$—, wherein $R_{87}$ and $R_{57}$ each, independently of the others, is a hydrogen atom, an alkyl group, an aryl group, an arylalkyl group, or an alkylaryl group, and (b) $R_{80}$, $R_{81}$, $R_{82}$, $R_{83}$, $R_{84}$, and $R_{85}$ each, independently of the others, is (i) a hydrogen atom, (ii) a hydroxy group, (iii) an amino group of the formula —$NR_{88}R_{89}$, wherein $R_{88}$ and $R_{89}$ each, independently of the others, is a hydrogen atom, an alkyl group, an aryl group, an arylalkyl group, or an alkylaryl group, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group.

31. An ink composition according to claim 29 wherein the antioxidant or UV stabilizer molecule is 4-methoxy cinnamic acid.

32. An ink according to claim 1 wherein the antioxidant or UV stabilizer molecule is a trisaryl-1,3,5-triazine.

33. An ink composition according to claim 32 wherein the antioxidant or UV stabilizer molecule is of the formula

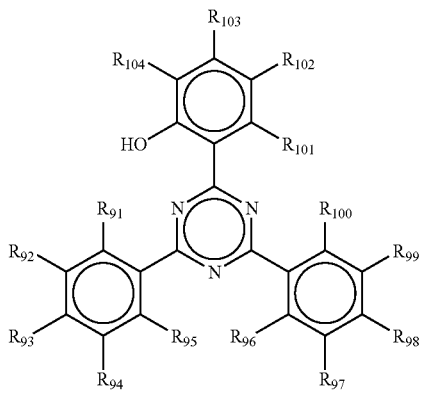

wherein, provided that at least one of $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{91}$, $R_{92}$, $R_{93}$, $R_{94}$, $R_{95}$, $R_{96}$, $R_{97}$, $R_{98}$, $R_{99}$, $R_{100}$, $R_{101}$, $R_{102}$, $R_{103}$, and $R_{104}$ each, independently of the others, is (i) a hydrogen atom, (ii) a hydroxy group, (iii) an amino group of the formula —$NR_{105}R_{106}$, wherein $R_{105}$ and $R_{106}$ each, independently of the others, is a hydrogen atom, an alkyl group, an aryl group, an arylalkyl group, or an alkylaryl group, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group.

34. An ink composition according to claim 32 wherein the antioxidant or UV stabilizer molecule is of the formula

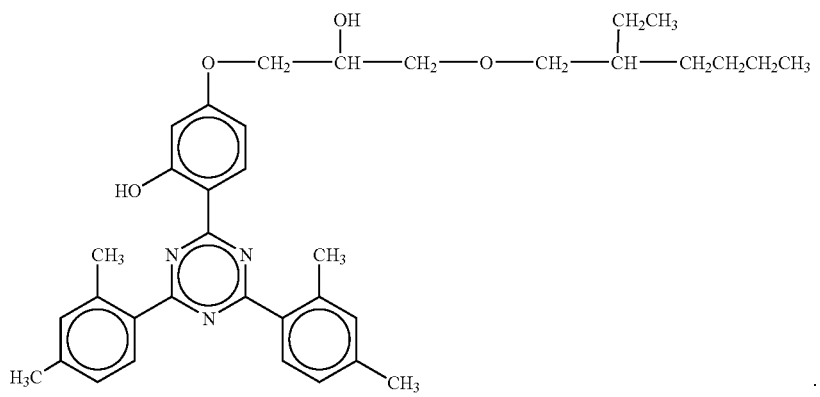

35. A compound comprising the reaction product of (i) a diisocyanate, (ii) an antioxidant or UV stabilizer molecule having thereon (A) at least one isocyanate-reactive hydroxyl group and/or (B) at least one isocyanate-reactive primary or secondary amino group, and (iii) a chromophore having thereon (A) at least one isocyanate-reactive hydroxyl group and/or (B) at least one isocyanate-reactive primary or secondary amino group, wherein the antioxidant or UV stabilizer molecule is (I) of the formula

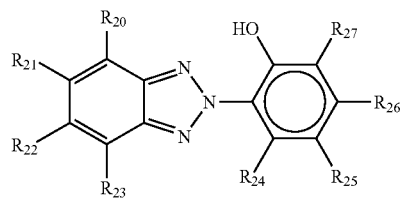

wherein, provided that at least one of $R_{20}$, $R_{21}$, $R_{23}$, $R_{23}$, $R_{24}$, $R_{25}$, $R_{26}$, and $R_{27}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{20}$, $R_{21}$, $R_{23}$, $R_{23}$, $R_{24}$, $R_{25}$, $R_{26}$, and $R_{27}$ each, independently of the others, is (i) a hydrogen atom, (ii) a hydroxy group, (iii) an amino group of the formula —$NR_{28}R_{29}$, wherein $R_{28}$ and $R_{29}$ each, independently of the others, is a hydrogen atom, an alkyl group, an aryl group, an arylalkyl group, or an alkylaryl group, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group, (II) a butylated hydroxytoluene, (III) a diaromatic secondary amine, (IV) a diphenyl acrylonitrile ester, (V) a cinnamate, (VI) a trisaryl-1,3,5-triazine, or (VII) mixtures thereof.

36. A process which comprises (1) incorporating into an ink jet printing apparatus a phase change ink composition comprising (a) a colorant and (b) the reaction product of (i) an isocyanate and (ii) an antioxidant or UV stabilizer molecule having thereon (A) at least one isocyanate-reactive hydroxyl group and/or (B) at least one isocyanate-reactive primary or secondary amino group, wherein the antioxidant or UV stabilizer molecule is (I) of the formula

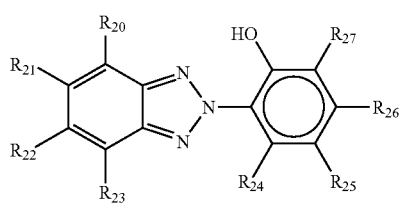

wherein, provided that at least one of $R_{20}$, $R_{21}$, $R_{23}$, $R_{23}$, $R_{24}$, $R_{25}$, $R_{26}$, and $R_{27}$ is an isocyanate-reactive hydroxy group, an isocyanate-reactive amino group, an isocyanate-reactive hydroxy-substituted alkyl group, an isocyanate-reactive amino-substituted alkyl group, an isocyanate-reactive hydroxy-substituted aryl group, an isocyanate-reactive amino-substituted aryl group, an isocyanate-reactive hydroxy-substituted arylalkyl group, an isocyanate-reactive amino-substituted arylalkyl group, an isocyanate-reactive hydroxy-substituted alkylaryl group, an isocyanate-reactive amino-substituted alkylaryl group, an isocyanate-reactive hydroxy-substituted alkoxy group, an isocyanate-reactive amino-substituted alkoxy group, an isocyanate-reactive hydroxy-substituted aryloxy group, an isocyanate-reactive amino-substituted aryloxy group, an isocyanate-reactive hydroxy-substituted arylalkyloxy group, an isocyanate-reactive amino-substituted arylalkyloxy group, an isocyanate-reactive hydroxy-substituted alkylaryloxy group, an isocyanate-reactive amino-substituted alkylaryloxy group, an isocyanate-reactive hydroxy-substituted polyalkyleneoxide group, an isocyanate-reactive amino-substituted polyalkyleneoxide group, an isocyanate-reactive hydroxy-substituted polyaryleneoxide group, an isocyanate-reactive amino-substituted polyaryleneoxide group, an isocyanate-reactive hydroxy-substituted polyarylalkyleneoxide group, an isocyanate-reactive amino-substituted polyarylalkyleneoxide group, an isocyanate-reactive hydroxy-substituted polyalkylaryleneoxide group, or an isocyanate-reactive amino-substituted polyalkylaryleneoxide group, $R_{20}$, $R_{21}$, $R_{23}$, $R_{23}$, $R_{24}$, $R_{25}$, $R_{26}$, and $R_{27}$ each, independently of the others, is (i) a hydrogen atom, (ii) a hydroxy group, (iii) an amino group of the formula —$NR_{28}R_{29}$, wherein $R_{28}$ and $R_{29}$ each, independently of the others, is a hydrogen atom, an alkyl group, an aryl group, an arylalkyl group, or an alkylaryl group, (iv) an alkyl group, (v) an aryl group, (vi) an arylalkyl group, (vii) an alkylaryl group, (viii) an alkoxy group, (ix) an aryloxy group, (x) an arylalkyloxy group, (xi) an alkylaryloxy group, (xii) a polyalkyleneoxy group, (xiii) a polyaryleneoxy group, (xiv) a polyarylalkyleneoxy group, or (xv) a polyalkylaryleneoxy group, (II) a butylated hydroxytoluene, (III) a diaromatic secondary amine, (IV) a diphenyl acrylonitrile ester, (V) a cinnamate, (VI) a trisaryl-1,3,5-triazine, or (VII) mixtures thereof; (2) melting the ink; and (3) causing droplets of the melted ink to be ejected in an imagewise pattern onto a substrate.

37. A process according to claim 36 wherein the substrate is a final recording sheet and droplets of the melted ink are ejected in an imagewise pattern directly onto the final recording sheet.

38. A process according to claim 36 wherein the substrate is an intermediate transfer member and droplets of the melted ink are ejected in an imagewise pattern onto the intermediate transfer member followed by transfer of the imagewise pattern from the intermediate transfer member to a final recording sheet.

39. A process according to claim 38 wherein the intermediate transfer member is heated to a temperature above that of the final recording sheet and below that of the melted ink in the printing apparatus.

40. A process according to claim 36 wherein the printing apparatus employs a piezoelectric ink jet process, wherein droplets of the ink are caused to be ejected in imagewise pattern by oscillations of piezoelectric vibrating elements.

* * * * *